(12) United States Patent
Varon (10) Patent No.: US 8,108,267 B2
(45) Date of Patent: Jan. 31, 2012

(54) METHOD OF FACILITATING A SALE OF A PRODUCT AND/OR A SERVICE

(76) Inventor: Eli Varon, Fort Lauderdale, FL (US)

( * ) Notice: Subject to any disclaimer, the term of this patent is extended or adjusted under 35 U.S.C. 154(b) by 0 days.

(21) Appl. No.: 12/251,869

(22) Filed: Oct. 15, 2008

(65) Prior Publication Data

US 2010/0094714 A1  Apr. 15, 2010

(51) Int. Cl.
*G06Q 30/00* (2006.01)
(52) U.S. Cl. .................................................. 705/26.5
(58) Field of Classification Search .................. 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 5,239,462 A * | 8/1993 | Jones et al. ..................... 705/38 |
| 5,584,025 A | 12/1996 | Keithley et al. |
| 5,754,850 A | 5/1998 | Janssen |
| 5,794,216 A | 8/1998 | Brown |
| 5,848,399 A * | 12/1998 | Burke ............................. 705/27 |
| 5,850,352 A * | 12/1998 | Moezzi et al. ................ 345/419 |
| 6,058,397 A | 5/2000 | Barrus et al. |
| 6,331,858 B2 | 12/2001 | Fisher |
| 6,578,011 B1 * | 6/2003 | Forward ..................... 705/14.39 |
| 6,658,464 B2 | 12/2003 | Reisman |
| 6,826,539 B2 | 11/2004 | Loveland |
| 6,829,584 B2 | 12/2004 | Loveland |
| 6,839,880 B1 | 1/2005 | Morse et al. |
| 6,883,002 B2 | 4/2005 | Faudman |
| 6,975,755 B1 * | 12/2005 | Baumberg ..................... 382/154 |
| 7,062,722 B1 * | 6/2006 | Carlin et al. .................. 715/850 |
| 7,080,096 B1 | 7/2006 | Imamura |
| 7,225,148 B2 * | 5/2007 | Kassan ............................ 705/26 |
| 7,246,044 B2 * | 7/2007 | Imamura et al. .................. 703/1 |
| 7,277,572 B2 * | 10/2007 | MacInnes et al. ............. 382/154 |
| 7,298,378 B1 * | 11/2007 | Hagenbuch et al. ........... 345/589 |
| 7,478,054 B1 * | 1/2009 | Adams et al. .................... 705/26 |
| 7,574,381 B1 * | 8/2009 | Lin-Hendel ................. 705/26.9 |

(Continued)

OTHER PUBLICATIONS

"CAD review: an update on some of the players producing the latest bells and whistles in this ever evolving market", Building, v46n3, pp. 28-31, Jun./Jul. 1996. Dialog File: 15, Acc#: 06399497.*

(Continued)

*Primary Examiner* — Naeem Haq
(74) *Attorney, Agent, or Firm* — Laurence A. Greenberg; Werner H. Stemer; Ralph E. Locher (57) ABSTRACT

The method enables a user to see how a selected product or how a plurality of selected products look in an immersive three-dimensional scene that resembles an actual or real property to be constructed or updated, or the relevant portions thereof. Since the images of the scene are displayed immersively, the user can view the scene from any vantage point and at any angle just as if the user were walking around the actual property. The user can thus obtain a realistic impression of how the new or changed property will look and the approximate cost of the improvement without first constructing a new structure or implementing changes to an existing structure. This enables the user to view many different possible options in order to decide which option is most desired. The user can feel confident that corresponding changes made to the real property be pleasing to the user.

10 Claims, 4 Drawing Sheets

U.S. PATENT DOCUMENTS

| | | | |
|---|---|---|---|
| 7,661,959 B2* | 2/2010 | Green et al. | 434/75 |
| 7,899,719 B2* | 3/2011 | Lin-Hendel | 705/27.2 |
| 2002/0010734 A1* | 1/2002 | Ebersole et al. | 709/201 |
| 2002/0032546 A1 | 3/2002 | Imamura et al. | |
| 2002/0035520 A1* | 3/2002 | Weiss | 705/27 |
| 2002/0052755 A1* | 5/2002 | Whatley et al. | 705/1 |
| 2002/0065635 A1* | 5/2002 | Lei et al. | 703/1 |
| 2002/0156703 A1 | 10/2002 | Abekawa | |
| 2003/0046187 A1 | 3/2003 | Yu | |
| 2003/0083957 A1* | 5/2003 | Olefson | 705/27 |
| 2003/0097313 A1 | 5/2003 | Saul et al. | |
| 2004/0111334 A1 | 6/2004 | Parsons | |
| 2004/0113945 A1* | 6/2004 | Park et al. | 345/765 |
| 2004/0233461 A1 | 11/2004 | Armstrong et al. | |
| 2006/0015925 A1* | 1/2006 | Logan | 725/135 |
| 2006/0190285 A1* | 8/2006 | Harris et al. | 705/1 |
| 2007/0192203 A1* | 8/2007 | Di Stefano | 705/26 |
| 2007/0282695 A1* | 12/2007 | Toper et al. | 705/26 |
| 2009/0024628 A1* | 1/2009 | Angel et al. | 707/9 |
| 2010/0005009 A1* | 1/2010 | Lin-Hendel | 705/27 |
| 2010/0030578 A1* | 2/2010 | Siddique et al. | 705/3 |
| 2011/0246335 A1* | 10/2011 | Li | 705/27.1 |

OTHER PUBLICATIONS

John C. Briggs, "The promise of virtual reality", Futurist, v30n5, pp. 13-18, Sep./Oct. 1996. Dialog File: 15, Acc#: 01292444.*

Himanshu Patel et al. "Virtual reality technology in business", Management Decision, v32n7, pp. 5-12, 1994. Dialog File: 15, Acc#: 00957062.*

Niklas Von Daehne "Design your home office", Success, v41n5, pp. 46, Jun. 1994. Dialog File: 15, Acc#: 00868807.*

* cited by examiner

METHOD OF FACILITATING A SALE OF A PRODUCT AND/OR A SERVICE

BACKGROUND OF THE INVENTION

1. Field of the Invention

The invention relates to selling manufactured products, real properties, remodeling services, and construction services.

2. Description of the Related Art

A significant financial cost and a significant period of time are typically required to update a portion of an existing structure, for example, to remodel a room in a residential or a commercial property. Constructing an entirely new improvement on a plot of land, for example, a residence, an office building, or a pool also requires a significant financial cost and a significant period of time. One drawback of the process is that the changed or new structure must actually be built before the changes or additions can be seen. The finished changes or additions may end up appearing differently from the way that the customer had envisioned. In this case, the end result might not be as desired and the customer might be quite unsatisfied. At that time, however, the customer has already paid for the materials and the labor and has waited for the lengthy construction process to be completed. To now perform additional changes or to completely change the finished product will likely be cost prohibitive and will certainly be wasteful of time and resources.

Another problem relates to the conventional manner of selling real properties. A real estate agent typically brings a customer or prospective buyer to a large number of real properties before the buyer finds a property that is of interest. This is very time consuming and burdensome for both the real estate agent and the buyer. Another drawback is that the conventional manner of selling real properties does not allow the buyer to experience what the property might look like if certain portions or aspects of the property were remodeled, or if different furniture or other household items were placed in the property.

Additionally, even after the time consuming process of visiting a large number of properties has been completed, and even after the buyer has placed a bid on a property and the seller has accepted that bid, there are many things that can prevent a contract from being completed. For example, if the property does not pass an inspection, the buyer, the seller, or both may no longer wish to complete the contract to purchase the property. Problems with the title to the property can also cause the contract to fail. Another example of a potential problem is that the financing for the deal might fall through. In any of those occurrences, the large amount of time that the real estate agent and the buyer have spent visiting properties has been wasted. The time expended by the seller, the title company, and the lender has also been wasted.

In fact, the entire real estate sales process is very inefficient and burdensome for the buyer. The buyer wastes a lot of time in traffic while visiting a lot of properties. The buyer visits a lot of properties that do not meet the buyer's needs. The buyer does not know how much it will cost to furnish the property, or how much it will cost to rehab the property. The cost of even simple cosmetic repairs, such as, changing doorknobs, caulking holes, and applying touch-up paint is not known. The buyer must pay for an appraisal and for an inspection, and if the deal falls through, these costs are not recovered. The buyer may not always be made aware of all suitable properties that are for sale, even when other buyers may be aware of such properties. Lenders do not always accurately disclose the costs to the buyer. Buyers may spend a lot time showing the property to friends and family and that time is wasted if the deal dies. If the buyer doesn't make an offer on a property, the time spent visiting that property is wasted. It may be difficult for the buyer to obtain time off from work. Visiting numerous properties in one day is an exhausting ordeal for a buyer. Typically, at the end of a day, the buyer cannot remember all of the properties that were visited and/or the buyer can't remember which property was which. Usually the buyer will not remember the specific features of each property or what specific furnishings are in each property.

The real estate sales process is inefficient and burdensome for the seller as well. The seller will typically pay a high commission. The seller will have to tolerate a lot of undesirable things due to the large number of people visiting the property. Lights may be left on, doors may be left open, a lot of strangers will visit the property, nosy neighbors will visit the property, and people who are really just looking rather than being interested buyers will visit the property. The seller needs to keep the property clean at all times. Valuable items may be stolen from the property. The entire sales process is a gross invasion of the seller's privacy. The seller must also accept the risk that a deal will die after a contract is signed.

BRIEF SUMMARY OF THE INVENTION

With the foregoing and other objects in view there is provided, in accordance with the invention, a method of facilitating a sale. The method can be used for selling any type of manufactured product, for example, kitchen cabinets, counter tops, sinks, and faucets. The method can also be used for selling construction services, for example, services for installing kitchen cabinets, counter tops, sinks, and faucets, and for selling design and architectural services that might be needed to remodel a kitchen, for example.

The method includes a step of enabling the user of a computing device to select at least one of a plurality of products being sold. The method also includes a step of displaying, on an electronic display, an immersive three-dimensional image of a scene with the product that has been selected shown therein. If a plurality of products has been selected, then the plurality of products can be shown in the immersive three-dimensional image of the scene. One example of a scene is a kitchen and some examples of products being sold include kitchen cabinets and counter tops.

The method enables the user to see how the selected product or how a plurality of selected products look in a three-dimensional scene that resembles an actual or real property to be constructed or updated, or the relevant portions thereof. Since the images of the scene are displayed immersively, the user can view the scene from any vantage point and at any angle just as if the user were moving around inside or outside the actual property. In other words, the user can adjust the position from which the scene is viewed—upwards, downwards, to the left and to the right. This enables the user to view the scene just as if the user were walking to the left and to the right in the actual property represented by the scene and as if the user were crouching down or standing on a ladder inside or outside the actual property represented by the scene. The user can view the scene, from the adjusted position, by looking straight at the scene at an angle perpendicular to the plane of the scene. The user can also view the scene, from the adjusted position, at an angle directed towards the left or right and/or in an upward direction or downward direction. In this manner, the user can view the scene just as if the user were located in the actual property, which is represented by the scene, at a position corresponding to the adjusted position, and just as if the user were turning his/her head in different directions.

The user can thus obtain a realistic impression of how the changed property will look without first implementing changes to an existing structure. This enables the user to view many different possible options in order to decide which option is most desired. When the decision to go forward with corresponding changes to the real property is made, the user can feel confident that the changes will be pleasing to the user, since the user has been provided the opportunity to view the changes in an immersive environment similar to a real life situation.

The method can be also used for selling existing real properties or for selling new real properties to be constructed. The real properties can be land or real estate structures, such as residential properties, commercial properties, pools, patios, additional rooms, etc. In this case, the real properties will be considered to be products, and the scene will be the portion of the real property being displayed in the immersive three-dimensional image. The user can view different real properties being displayed without visiting each property. In the case of a new structure to be constructed, the user can obtain a realistic impression of how the new structure would look without first constructing the new structure.

With the foregoing and other objects in view there is provided, in accordance with the invention, method of facilitating a sale of a real property. The method includes enabling a user of a computing device to select a real property from a plurality of real properties being sold; and displaying, on an electronic display, an immersive three-dimensional image of the real property that has been selected.

A preferred way of providing the immersive images is to perform the calculations to create the images by using a three-dimensional virtual camera.

Other features which are considered as characteristic for the invention are set forth in the appended claims.

Although the invention is illustrated and described herein as embodied in a method of facilitating a sale, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS OF THE INVENTION

Figure 1:
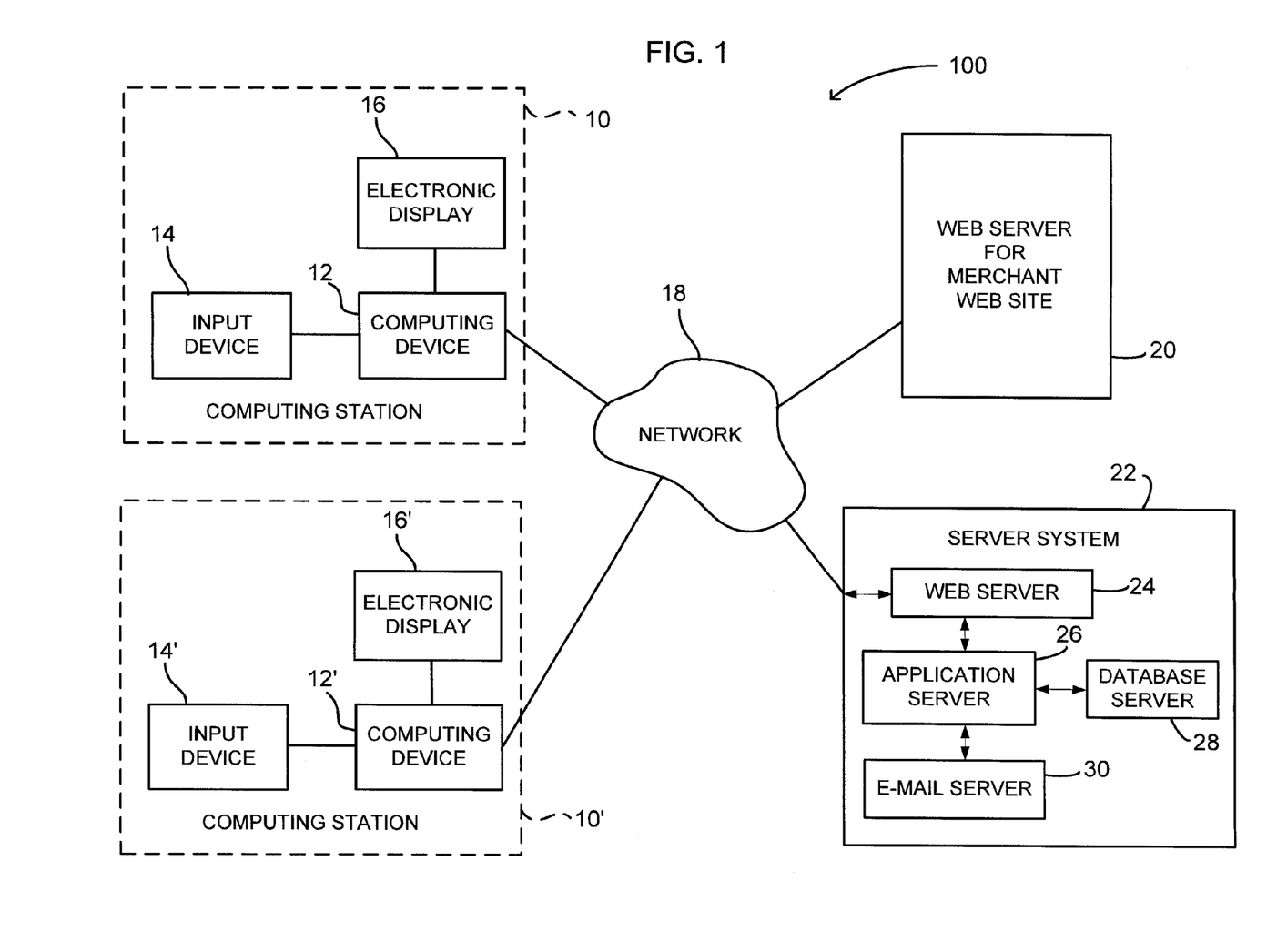
FIG. 1 is a diagram showing an exemplary embodiment of a system for facilitating a sale.

Referring now to the figures of the drawing in detail and first, particularly, to FIG. 1 thereof, there is shown an exemplary embodiment of a system 100 for facilitating the sale of one or more products to a prospective customer that might be interested in purchasing such products. The system 100 includes one or more computing stations 10, 10'. Each computing station 10, 10' includes a computing device 12, 12', which could be, for example, a personal computer. Each computing station 10, 10' also includes one or more cooperating input devices 14, 14' and one or more electronic displays 16, 16' that are operatively connected to the computing device 12, 12'. An input device 14, 14' can be, for example, a keyboard, a mouse, a joystick, a game controller, or some other type of device for inputting control commands to the computing device 12, 12'. In certain embodiments, the electronic display 16, 16' can be any display that is typically used with a computer, for example, a CRT (cathode ray tube) or an LCD (liquid crystal display) screen. The electronic display 16, 16' can also be the display screen of a television. In this case, the electronic display 16, 16' is used to display three-dimensional images by representing three-dimensional objects in two dimensions. One example of accomplishing this is by using, for example, axonometric projections. Three types of well-known axonometric projections include isometric projections, dimetric projections, and trimetric projections. The electronic display 16, 16' can alternatively be a pair of glasses or goggles. The glasses or goggles can have one display screen for displaying an image to both eyes. Alternatively, the glasses or goggles can have a separate display screen for each eye so that three-dimensional objects can also be represented in two dimensions using axonometric projections.

In order to provide an experience for the user that even more closely resembles a real-life situation, the electronic display 16, 16' can be configured to represent three-dimensional objects using stereographic images that trick the brain of the user or viewer into seeing actual three-dimensional images. One possible way of showing stereographic images involves constructing the electronic display 16, 16' with a first display screen showing a first image to one eye of the user and with a second display screen showing a second slightly different image to the other eye of the user.

The system 100 enables the prospective customer or any other person functioning as a "user" of the system 100, to view the electronic display 16, 16' to see an immersive three-dimensional representation of a scene in which images of one or more products are shown therein. This immersive quality is obtained by enabling the user to change both the location of the virtual camera and the viewing angle of the camera in 3-D space to change the vantage point from which the user sees the scene. Therefore, the user is in effect immersed in the displayed three-dimensional images of the scene in which images of one or more products are shown therein. By using an appropriate input device 14, 14', the user can in effect move to any location in the scene and can look at the scene in any direction. One possible way of obtaining this realistic immersive quality is by using a virtual 3-D camera to perform the calculations to create the scene.

The images of the products that are displayed may be images of any products for which it will be advantageous to enable the user to view the products not only in three-dimensions, but also in a particular scene that is of interest to the prospective purchaser. If the user is considering placing one or more actual products in or on a real property, for example, the user can first actuate an input device 14, 14' to select a scene that resembles the real property or the relevant portion of the real property. The user can select the scene that provides the best representation by actuating an input device 14, 14', for example, a mouse to click on one of a plurality of thumbnails representing a plurality of predefined scene templates, for example. The user can then use an appropriate input device 14, 14' in order to configure an image of each of the selected products in any desired particular location and in any desired particular orientation in the scene. The user can then see how the selected product or how the combination of selected products look when they are positioned and configured in the desired locations and in the desired orientations in the scene. By viewing the scene, the user obtains an accurate impression of how the actual product or products will look in corresponding positions and orientations in or on the real property or in or on the relevant portion of the real property. In this manner, the system 100 advantageously assists the user of the system 100 in deciding whether or not to purchase a particular product or products. Of course the decision may also involve deciding whether or not to have a qualified service provider install or construct the particular product or products in the positions and orientations shown in the scene.

The computing device 12, 12' and the application software running on the computing device 12, 12' use data describing the scene and data describing the selected product or products to perform all of the calculations required to configure images of the selected product or products in the desired locations and orientations in the scene. The computing device 12, 12' and the application software running on the computing device 12, 12' also perform the calculations, preferably, but not necessarily using a three-dimensional virtual camera, to allow the user to change the position (location and direction of view or focus) of the virtual camera in order to change the vantage point so that the elements in the scene can be viewed from any location and at any angle that is desired by the user.

Moreover, the computing device 12, 12' and the application software running on the computing device 12, 12' enable the user to easily and quickly change the selected product or products being shown in the scene. For example, suppose the user is evaluating how a particular type of product looks in a scene based up the user's personal preferences. The terms "a particular type of product" is meant to distinguish between, for example, a cabinet, an appliance, a counter top, a sink, a faucet, paint, etc. Once the user has selected a particular type of product, the user can view a plurality of modified views of the scene in which a different style or model of the type of product is shown in each modified view of the scene. For example, the user can determine whether one model of a cabinet is preferred rather than another model of a cabinet. Accordingly, the user can change back and forth between the modified views of the scene to obtain a good impression of how each style or model of the product will look in corresponding positions and orientations in or on the real property or in or on the relevant portion of the real property. This enables the user to choose between similar products that are manufactured by one or more manufacturers. The user can also place different combinations of products in the scene to obtain a good impression of how each combination of products will look in corresponding positions and orientations in or on the real property or in or on the relevant portion of the real property. The user can also change the position and/or orientation of any selected product so that the user can find the configuration that is the most visually pleasing and/or that is the most desired for functional reasons in addition to aesthetic reasons. As will be explained in more detail below, the user can chose to purchase the selected product or the combination of selected products, or alternatively the user can rank the selected product or the combination of selected products according to his/her order of preference. In this manner, the rankings can be reviewed at a later time in order to determine which product or combination of products will be purchased.

A scene can also be used to represent a plot of land so that the user can obtain a good impression of how improvements to the land will appear if such improvements were actually performed on the land. Such an improvement can be a structure, for example, a residence, a commercial building, a pool, or a garage. The few examples that have been mentioned should not be considered to be limiting since many other improvements are possible. In the case just described, the displayed scene will include the external features of the residence or commercial building. The application software running on the computing device 12, 12' allows the user to change the location and viewing angle of the virtual camera in order to change the vantage point so that the elements in the scene can be viewed from any location external to the structure. It should be understood that the application software also allows the user to enter the structure and view any internal feature from any internal vantage point and/or viewing angle. Other examples of structural improvements include, but are not limited to, swimming pools, patios, decks, roofs, exterior paint, fencing, doors, windows, etc. Such an improvement can also relate to landscaping, for example, the sculpturing of trees and vegetation on the plot of land. In the case just described, the displayed scene will include the sculptured features on the plot of land. The improvements can be considered to be products. For example, a swimming pool is a particular type of product, and each different design of the swimming pool is a different style or model of the swimming pool. A user that desires to see an immersive three-dimensional image of the swimming pool on the plot of land will first either select a template of a scene representing the plot of land that is to be improved, or can have an exact scene created from photographs in combination with blueprints of the swimming pool and a survey of the plot of land. The user will then select different models of pools to be displayed in the images so that the user can determine which model is most desired to be constructed on the actual plot of land. Once again, the application software running on the computing device 12, 12' allows the user to change the position and location of the virtual camera in order to change the vantage point so that the selected swimming pool in the scene can be viewed from any location and at any angle.

As another example, the product can be considered to be an entire residential or commercial building. The building can be an existing one or one that will be built to the users specifications. In this case, scenes will be constructed for each room in the building so that the user can see immersive three-dimensional images of the interior of each room in the building. The application software enables the user to move, add, delete, and/or modify walls and/or change furnishings so that the user can see each room in a desired modified state. With regard to the furnishings, the application software enables the user to change the size, shape, color, and/or any desired design characteristic of any furnishing. If the scene is of an existing building, for example, a furnished residence that is for sale, the application software allows the user to remove, add, and/or modify any existing feature, for example furniture, walls, ceiling, etc so that the user can obtain an image that is modified as desired. Using one or more input devices 14, 14', the user can seamlessly move the location of the virtual camera to any location within a scene and can seamlessly move the location of the virtual camera from one scene to another scene. Thus, the displayed images simulate the view that the user would obtain if the user were walking through one room represented by a scene and into another room represented by another scene. In other words, the user can seamlessly move from room to room. Additionally, at any location in any scene, the user can adjust the angle of view so that the displayed images simulate the view of the room, which is represented by the scene, that the user would obtain if the user were looking in the room and in the direction corresponding to the angle of view of the camera in the scene.

Consider the case where the system 100 is used to sell real estate. The potential customer and the real estate agent no longer have to travel to the location of each real property, for example, a building and/or a plot of land in order to evaluate whether the property is desirable. The user can evaluate the properties of initial interest by viewing immersive three-dimensional images of each room of the property and by viewing immersive three-dimensional images of the exterior of the property. In this case scenes will be created for the rooms and for the lot with the property. A viewed room can be any conceivable room of a property or a building. For example, a viewed room can be a closet, pantry, crawlspace, elevator, fire exit, stairwell, attic, hallway, bedroom, dining room, living room, porch, dining hall, conference room, etc. The user can select the properties that are of interest so that they can be personally visited. The user can even rank the selected properties according to the level of interest. The selected properties can be further reviewed if desired and then only the highest ranked selected properties can be personally visited. This saves the user an enormous amount of time. The user can save data, which indicates which properties have been selected, on a memory device. The user can also save any changes made to the property along with any selected products and/or changes to selected products on the memory device. Data indicating a ranking of the properties can also be stored. The memory device could be provided as a part of the computing station 10, 10', a part of the server system 22, or as part of a portable device that can be kept in the possession of the user. Such a portable memory device is not limited to but could be a well-known flash memory stick or a credit card with an embedded memory therein. The portable memory device can be used anywhere in the world where there is access to the network 18 that is connected to the server system 22.

Additional efficiency can be added to the process of selling real estate by requiring the seller to satisfy certain conditions before the seller's property can be added to the database of properties of the system 100. For example, the seller can be required to perform a title search and various property inspections before the appropriate scenes are created and before the property is entered on the system 100. The property valuation, for example, an appraisal or a financial analysis may also be required before the property is entered into the system 100. If certain repairs need to be undertaken, it can also be required that such repairs be performed before the property is entered into the system 100. Alternatively, all necessary repairs disclosed by the seller and/or all necessary repairs uncovered by an inspection can be entered into the system 100 along with cost estimates for performing the repairs so that a user of the system 100 is appraised of any additional expenses related to the property. Additionally, the customer or buyer can be required to obtain a pre-qualified loan or a fully approved loan with conditions before the customer will be accepted as a client and allowed to use the system 100. Anything that was conventionally performed by the buyer or seller after the offer and acceptance of a contract for sale, may now be required to be addressed before the seller can enter his property for sale on the system 100 and before the buyer can use the system 100 in order to search for desirable properties. By taking these measures it can be ensured that once a buyer or customer makes an offer and the seller accepts the offer, a contract for sale of the property will likely be completed. This is the case since there are no longer any contingent conditions or are only a small number of conditions in the contract for sale. This provides an enormous efficiency benefit because contracts will most likely be completed since there is no longer a large number of contingent conditions that might not be satisfied after a lot of time and effort have been expended by multiple parties, for example, an inspector, an appraiser, a title company, a lender, a seller, and a buyer.

Now let us consider an example where the system 100 is used to remodel an existing room in an existing structure. For each type of room that might be modified in an existing structure, a plurality of predefined templates can be created. Each template is a scene representing an actual room. Each template, which represents a particular type of room, also shows a particular layout of the room. For example each template shows a room with a particular shape and configuration of walls. Each template also shows the products, which are typically found in that type of room and even possibly products that are not typically found in that type of room, configured in particular locations and in particular manners. Let us take a kitchen as an example. Some templates show rectangular kitchens, some templates show L-shaped kitchens, and some templates show long narrow hall-type kitchens, for example. In addition, each template with a particular shape, for example, the rectangular shape, shows the cabinets in a particular location, the sink in a particular location, the dishwasher in a particular location, the stove in a particular location, the refrigerator in a particular location, etc. Once a template is selected the user can move the locations of these products as desired, and can add, delete, and/or modify certain products as desired. The user can also add selected products to a shopping cart for purchase and can see the cost to purchase and/or install the selected products.

It is also possible to create the scene representing the actual room to be modified by using the exact dimensions and the exact layout of the actual room in the existing structure. It is preferable to have a floor plan or blueprint of the room however, this is not absolutely necessary since measurements of the room can be taken. If a floor plan or blueprint is available, it is scanned and input into a computer (not shown) of the system 100. An application program or a person traces the floor plan in order to create a shell of the structure in three dimensions. Then photographs of the actual room are used to create the various surfaces of the shell. A similar process takes place with a plot of land. If a survey is available, it is scanned and input into a computer of the system. The application program or the person traces the survey in order to create a shell of the plot of land in three dimensions. Pictures of the plot of land are used to create various surfaces of the shell.

Suppose, for example, a user desires to remodel the kitchen in a residential property. In this case, the scene will be chosen to represent the actual kitchen in the residential property. The user can be presented with a plurality of different layouts or templates of a kitchen, and the user will select whichever one of the templates best represents the kitchen to be remodeled. The template with the best representation will be the one in which the positions of the stove, refrigerator, dishwasher, sink, etc., and the overall shape of the kitchen defined by the walls thereof most closely correlate with those of the actual kitchen as it presently exists or as it will be modified according to the preferences of the user. Alternatively, the scene of the kitchen can be constructed to exactly represent the actual kitchen to be remodeled. In this case, all of the dimensions of the actual kitchen will be used. These dimensions can be obtained from measurements of, for example, the height from the floor to the ceiling, the width, the length of the kitchen, and the angles of the walls and surfaces so that all of the information contained in blueprints of the room is obtained. If such blueprints are available then such measurements are not necessary. The dimensions of the kitchen along with photographs of the actual kitchen can be used to create the scene. The prospective customer can take such photographs and send the photographs to the appropriate party so that an exact scene can be created using the photographs. Another option is for the customer to request that the appropriate personnel are sent to the relevant location in order to take photographs and/or measurements for creating the exact scene.

After the appropriate kitchen template or layout is chosen for the scene or the scene is constructed from photographs and dimensions, the user will then choose one by one whichever products or other features of the kitchen are to be updated or remodeled. Suppose, for example, the user desires to remodel the kitchen by installing new cabinets, a new counter top, a new sink, and a new faucet. Suppose paint will also be applied to the walls of the kitchen. The user can, for example, select a particular model of kitchen cabinets from many different models of kitchen cabinets that are available for sale. The user will configure the cabinets in a particular orientation and location in the scene. The orientation and location can be changed until the user finds the most pleasing configuration. The user can then select a particular model of a counter top that is available for sale. If the user is not satisfied with the look of any of the counter tops with the selected cabinets, the user can go back and change the model, position, color, size, and/or orientation of the cabinets. The selection process will similarly continue for a sink, a faucet, and for the color and texture of the paint for the walls until each item in the selected combination is acceptable to the user. At any point in the selection process, the user can change the location and angle of the virtual camera so that the user can obtain any view of the scene just as if the user were walking through the kitchen and looking at certain features from different locations and at different angles. The system 100 also changes the scene to enable the user to obtain any view just as if the user were walking from one room to a connected room. For example, the user can obtain any view just as if the user were walking from the kitchen to a connected dining room.

The system 100 may be set up to allow the user to save many different combinations of any of the items or products in the scene. Considering the example where the scene is a kitchen, the system 100 allows the user to save many different combinations of a cabinet configuration, a counter top, a sink, a faucet, paint, and also flooring and lighting, so that the user can compare the different scenes and select the scene with the combination, position, and orientation of products that is most desired. Once the user is satisfied with the selection of a particular product or the selection of a particular combination of products, the user can indicate an interest in purchasing one or more of the products, for example, by adding one or more selected products into a virtual sales cart. Alternatively, each product can be automatically placed into a virtual sales cart upon being selected.

The system 100 can be set up so that any item or product found in any room, not only the given example of a kitchen, can potentially be viewed in the scene. As a few additional examples, the products also can include flooring, lighting, ceilings, different types of appliances, furniture, doors, windows, staircases, any of the components of the staircases, and the styles of the knobs on the cabinets and doors. The user can then purchase all or some of the selected products in the scene and employ an appropriate service contractor in order to have the products installed in the room of their choice, for example, a kitchen. A single merchant or multiple merchants, depending on cost efficiency and product availability, could handle the sale of the selected products and the installation.

The scene can similarly represent any room in any real property, and any of the products being sold for placement in the room of the real property can be selected for placement in the scene as desired by the user. In this manner, the user can obtain a visual impression of how each room would appear if the particular room were remodeled and/or refurnished in accordance with the selected products. If a bathroom were going to be remodeled and/or refurnished, such products can include, for example, showers, bathtubs, faucets, sinks, bathroom counters and cabinets, etc. If a living room, family room, or bedroom were going to be remodeled and/or refurnished, such products can include wall coverings, such as paint, paneling, and wallpaper. Such products can also include furniture, such as, couches, tables, chairs, and beds, dressers, and various types of wall units. Other products that can be included in various scenes can include, for example, doors, windows, roofs, ceilings, interior and exterior lighting, patios, and miscellaneous fixtures, such as switches, wall plates, fans, sconces, etc. The products that have been listed above are merely examples and one should understand that many other types of products can be used with the system 100 and method described herein.

Additionally, the computing device 12, 12' and the application software running on the computing device 12, 12' enable the user to modify the layout of the scene itself. For example, consider the case where the user is contemplating creating, removing, moving, and/or modifying a wall in an actual room. In this case, the system 100 can provide the user with three-dimensional images of a scene, which represents the room, in which the wall is configured as desired and in which the other products in the room are shown in the scene with the wall. In this way, the user obtains an accurate impression of how the actual room would look if the wall in the actual room were changed and if the products in the actual room were configured as shown in the scene. The user can feel much more comfortable going forward with such changes since the user has obtained an accurate impression of how the changed room will look when completed. The fact that the user has viewed immersive 3-D images representing the room with the proposed changes reduces the possibility the user will find such changes to the actual room to be undesirable or unpleasing after the costly and time consuming changes are made to the actual room. Likewise, the same advantages are obtained when the scene represents any other actual structure, portion of an actual structure, and/or improvement to land.

The position of the virtual camera with respect to objects in the scene can be changed by appropriately actuating an input device 14, 14', such as a computer mouse, for example. As previously mentioned, the electronic display 16, 16' can be a pair of glasses or goggles. Since the glasses or goggles are worn on the head of the user, the glasses or goggles can also include an appropriate sensing device that senses the position and/or motion of the head of the user and converts the motion and/or position into control signals, which are input to the computing device 12, 12'. The computing device 12, 12' can then calculate the angle of focus or viewing angle of the virtual camera in 3-D space to change the vantage point from which the user sees the scene based upon the position and/or motion of the head of the user. For example, if the user looks up the user sees an upper portion of the scene from that vantage point, if the user looks down the user sees a lower portion of the scene from that vantage point, and if the user looks to the left the user sees a leftward portion of the scene from that vantage point. The displayed portion of the scene in each direction depends on how far in each direction the head is moved. It is possible to adjust the location of the virtual camera in the scene, not only with signals from a sensing device in the glasses, but alternatively with a mouse, a keyboard, or a joystick, for example.

A computing device 12, 12' can be located at the home, business location, or at any other location convenient for the prospective customer. In this case, each user can implement the method with a personal computer that is conveniently located at the home or place of employment of the user or at any other convenient location. A mobile computer, such as a notebook or laptop computer can also be used. One or more computing stations 10, 10', formed by a computing device 12, 12' and a cooperating display screen, can also be located at a retail location, the location of a manufacturer of products, or the location of a service professional. Service professionals that will find it advantageous to provide one or more computing stations 10, 10' at their location include, for example, manufacturers, retailers, designers, architects, landscape architects, and other service providers in the construction, remodeling, and furnishing fields. Education institutions will also find it advantageous to provide one or more computing stations 10, 10' at their locations for training purposes.

In certain situations, the application software can be manually installed on the computing device 12, 12'. In this case, the application software can first be stored on a physical storage medium, such as a CD (compact disk), DVD (digital video disk), or on any other viable form of a physical storage medium. The storage medium with the application software can then be distributed by a retail location, direct mail, a promotional event, or a business relationship, for example. After being distributed, the storage medium with the application software can be taken to the location of the computing device 12, 12' so that the application software can be installed thereon. Although not the most preferred way, it is even possible to include data describing different templates and different products on the physical storage medium.

The system 100, however, preferably utilizes a network 18, for example, the Internet. The computing device 12, 12', a web server 20 supporting a merchant's web site, and a server system 22 are all connected to the network 18 so that information, for example, the application software, data describing templates of the scenes, data describing products, data relating to price information, customer data, merchant information, and/or other information can be exchanged between the computing device 12, 12', the web server 20 supporting the merchant's web site, and the server system 22. One preferred way of implementing the system 100 involves providing a download link on a retailer's website. A user of a computing station 10, 10' will click on the download link on the retailer's website in order to automatically be directed to a web page supported by the server system 22 so that the application software can be downloaded from the server system 22, via an application server 26. It is well known that such application software is defined by a set of machine-readable instructions. The download preferably includes checking to see whether the computing device 12, 12' has graphics drivers that will function properly with the display device. If not, then proper graphics drivers are installed on the computing device 12, 12'. The server system 22 may also include a database server 28 for storing and supplying various data. This stored data may include data describing different templates and different products. Additionally, the server system 22 may include an e-mail server 30 for sending out various e-mails to users, merchants, manufacturers, service providers, education institutions, entities interested in economic information, and/or any other party connected with the system 100 in some way.

Thus far, the system 100 and the method enabled by the system 100 have been discussed with reference to the advantages of providing the prospective customer with accurate impressions of how changes to a real property will appear without having to actually perform those changes, and also with reference to the advantages of enabling a prospective customer to obtain initial impressions of multiple real properties without having to visit the real properties. The system 100 and the method enabled by the system 100, however, also preferably provide sales leads in order to assist retailers, manufacturers, other sellers of goods, and service professionals with marketing their goods and/or services to prospective customers. The application software preferably requests or requires the user to enter identifying information using the input device 14, 14' connected to the computing device 12, 12'. This identifying information includes information identifying at least an approximate location of the user so that a nearby retail location of the merchant or a retail location associated with the merchant in some way can be ascertained. The identifying information is preferably detailed enough such that a sales lead can be generated and can include, for example, the first and last name of the user, the zip code of the user, the mailing address and/or property address of the user, the e-mail address of the user, the phone number of the user, and/or the telephone number of the user. The server system 22 can forward the identifying information or sales lead to a nearby retail location or to another location or entity via e-mail, for example.

After the user has made the final selections, the application software preferably generates an inventory list of all of the products that have been finally selected by the user for purchase. The server system 22 can send additional information to the user, via the Internet and the computing device 12, 12', relating to the products in the inventory list. Such information can include, for example, the price of each of the selected products, the total price of all of the selected products, the cost to install the products, the availability of each of the selected products, information identifying the location of the nearest retail location at which the selected products are available, the name of the manufacturer of each of the selected products, and the product name, model number, and/or UPC (universal product code) of each of the selected products. The information can be sent to the e-mail address of the user or the system 100 can supply the information to the electronic display 16, 16' that the user is viewing.

An economic or financial incentive can be presented to the user in order to motivate the user to purchase the selected products and any associated services from a nearby retail location of the merchant. An economic incentive can be, for example, a demographically sensitive pre-configured loyalty reward program. Such a loyalty reward program can include coupons, reward points, discounts, gift cards, no interest or low interest credit cards, promotions, retail cross-selling opportunities, and/or manufacturers cross-sell or sell-up opportunities. The economic incentive can be provided as printable material or information that is sent to the e-mail address of the user or to the electronic display 16, 16' that the user is viewing.

The server system 22 may be configured to obtain statistical information that is useful for marketing and/or inventory adjustment based on the actions of the potential customers that are using a plurality of computing stations 10, 10', in which each computing station 10, 10' has a respective computing device 12, 12' running the application software. Pertinent information can also be sent to particular merchants and/or manufacturers via e-mail or other means. The server system 22 can keep track of the number of sales leads that have been generated. The overall system 100 can also be configured to keep track of the number of sales leads that result in a sale. One way of accomplishing this is by providing the user with material showing a listing of the user's choices wherein the user will show the listing to the merchant in order to obtain the selected products. Another way is to simply keep a record of the name of the user and compare the name to the names on completed sales contracts. The server system 22 can keep track of any type of statistical information relating to the viewed and selected scenes and products. For example, the server system 22 can keep track of the most viewed product in a product class, the least viewed product in a product class, the most selected product in a product class, and the least selected product in a product class. The server system 22 can also keep track of the absolute number of times that a product has been viewed and/or selected. The server system 22 can also keep track of the number of times that a particular scene has been viewed and/or selected. Statistical information relating to the least viewed scene, least selected scene, most viewed scene, most selected scene, and also to the number of times that a scene has been viewed and/or selected can be determined. For example, the server system 22 can keep track of the most viewed or most selected types of scenes (i.e. kitchen), the most viewed layout of a type of scene (i.e. a rectangular kitchen with an island), the number of times each particular product has been selected for viewing, and the number of times each particular product has been finally selected for purchase. The amount of time spent viewing a particular scene and/or a particular product can also be ascertained by the server system 22. The most popular styles of products can also be ascertained from the choices of the user. The server system 22 can also record customer feedback relating to particular products. Any and/or all of the statistical information can be used by the operator of the system 100 for marketing purposes, and/or for improving the operation and responsiveness of the system 100. The operator of the system 100 can also sell the statistical information to any institution desiring particular economic data revealed by the statistical information. The operator can also provide any and/or all of the statistical information to any of the operator's clients, for example, an education institution or any of the merchants selling goods and/or services on the system 100.

Other useful information about how potential customers use the system 100 can also be ascertained. The server system 22 and/or the merchant's website can keep track of, for example, the number of times that the application software has been downloaded. The server system 22 can also keep track of the number of times that the application software has been run, which of course can be more than the number of times that it has been downloaded. The server system 22 can record the average length of time that the users spend on the system 100, and the longest length of time that a user has spent on the system 100. This information can be used, for example, to improve certain features of the system 100 so that the user has the best and most fruitful experience on the system 100 and so that the system 100 is used to facilitate as many sales as possible.

The computing device 12, 12' could be constructed to cooperate with or to be a part of another unit, such as, a television.

Information relating to creating scenes and using virtual cameras to display images can be found by referring to WATT, Alan, 3D Computer Graphics, $2^{nd}$ edition, 1994, Instituto de Matematico Pura e Aplicada Rio de Janeiro, Brasil and University of Sheffield, England, Addison Wesley Publishing Company, which is incorporated by reference in its entirety.

Figure 2A:
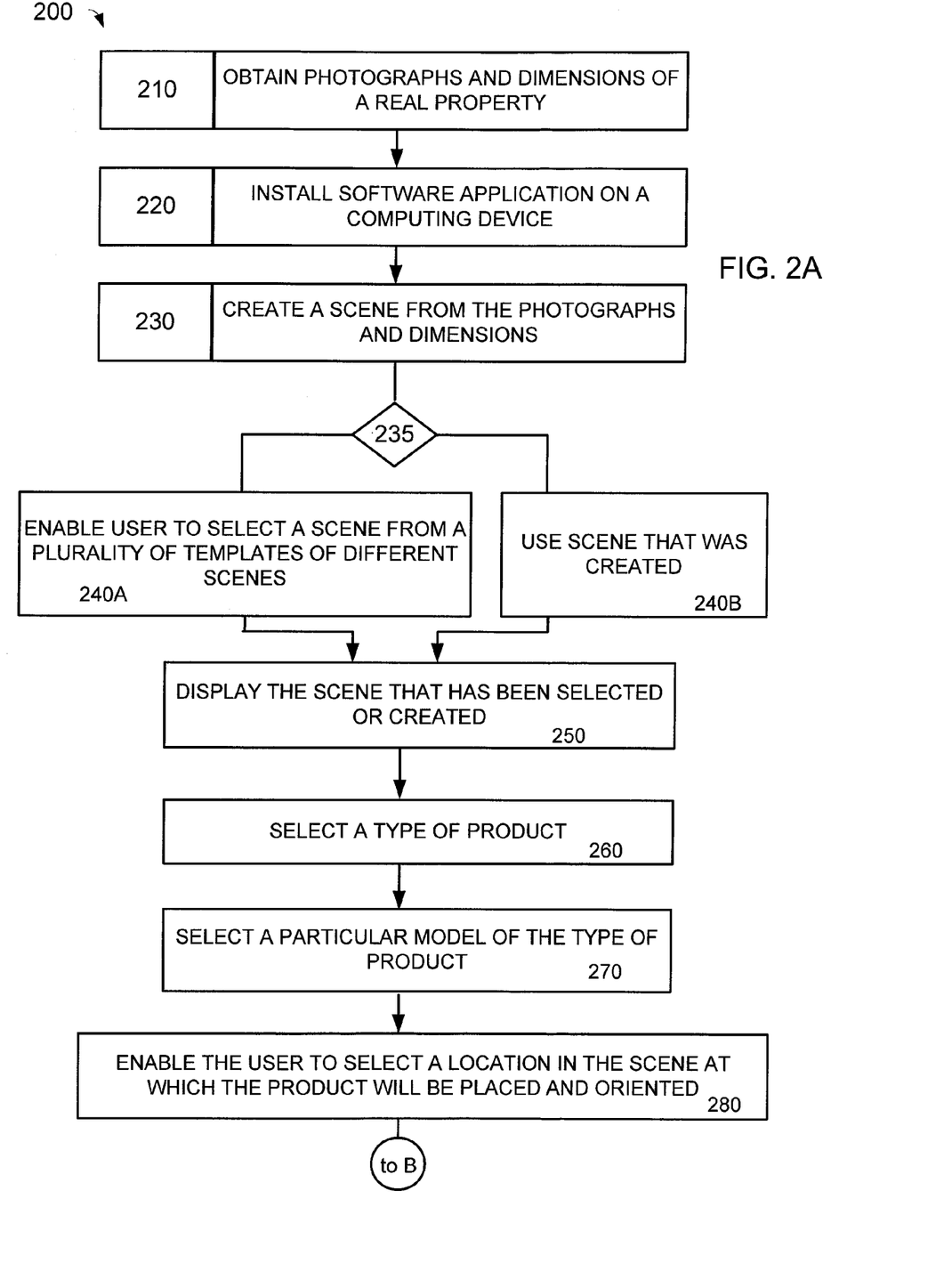
FIGS. 2A-2C show an exemplary embodiment of a method of facilitating a sale.
Figure 2B:
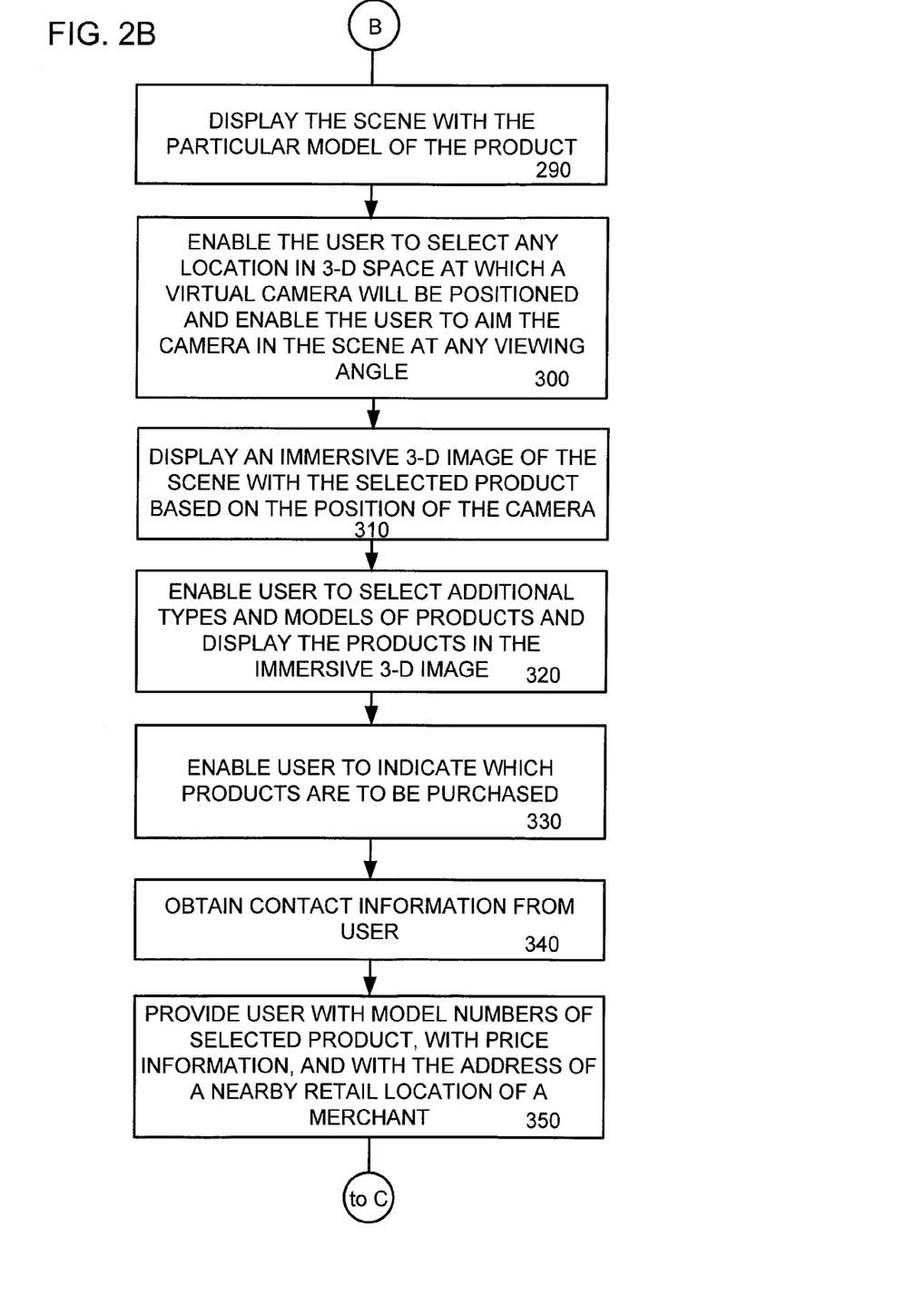
Figure 2C:
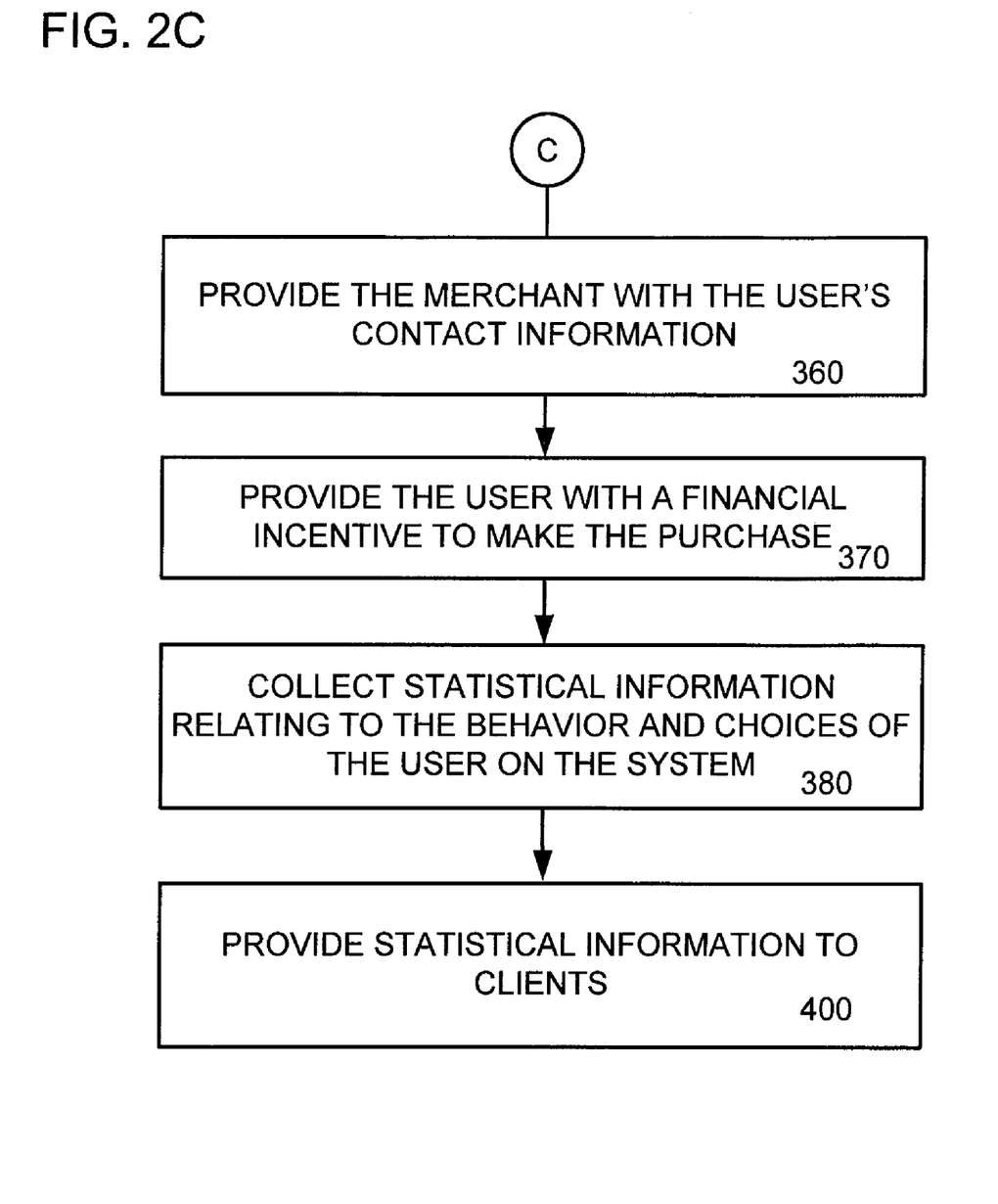

The method of facilitating a sale that is enabled by the system 100 can be ascertained from the previous description. FIGS. 2A-2C show an exemplary embodiment of the method 200 in order to additionally explain some of the method steps that can be performed. FIG. 2A is continued on FIG. 2B as indicated by the circle labeled "To B" on FIG. 2A and the corresponding circle labeled "B" on FIG. 2B. FIG. 2B is continued on FIG. 2C as indicated by the circle labeled "To C" on FIG. 2B and the corresponding circle labeled "C" on FIG. 2C.

Steps 210 and 230 are optional steps and when they are performed, step 240B will be performed instead of step 240A. If the user desires, the scene can be created from photographs and dimensions of the relevant portion or portions of the actual or real property. In this case, an operator of the server system 22 will obtain photographs and dimensions of the real property (step 210). The software application will be obtained, via downloading or a physical storage medium, and will be installed on a computing device 12, 12' (step 220). A scene of the relevant portion or portions of the real property will be created from the photographs and dimensions (step 230). The diamond labeled 235 does not actually represent a method step, but rather is used to indicate that either step 240A or step 240B can be performed. If the scene has been created from photographs and dimensions in step 230, then that scene will be used (step 240B). If a scene has not been created from photographs and dimensions, or if the user prefers the layout on one of the scene templates, then the user will use an input device 14, 14' to select the scene from a plurality of templates of different scenes that are displayed (step 240A) on the electronic display 16, 16'. The scene that has been selected or created will be displayed (step 250) on the electronic display 16, 16'.

The user will next select a type of product to be displayed in the scene (step 260). Next, the user will select a particular model of the type of product (step 270). The user will select a location in the scene at which the product will be placed and the user will orient the product as desired (step 280). The scene with the particular model of the product configured therein is displayed (step 290). The user can select any location in 3-D space at which a virtual camera will be positioned and the user can aim the camera at the scene in any viewing angle (step 300). An immersive 3-D image of the scene with the selected product is displayed on the electronic display 16, 16' based on the position and orientation of the camera (step 310). The user may select additional types and models of products to be displayed in the immersive 3-D image (step 320), and may additionally or alternatively make any desired changes. The user will indicate which products will be purchased (step 330).

The user will enter his/her contact information into the computing device 12, 12', via the input device 14, 14', and this contact information will be sent to the server system 22 via the Internet (step 340). After the user has provided his/her contact information, the server system 22 will provide the user, via the internet and the computing device 12, 12', with the model numbers of the selected products, the prices of the selected products, the approximate cost to install the selected products, and the address and phone number of a nearby retail location of a merchant selling the selected products (step 350). The merchant may also be provided with the user's contact information so that the merchant can follow up on the sales lead (step 360). The user can be provided with a financial incentive, such as a printable discount coupon, for example, to purchase the products from the retail location of the merchant (step 370). The server system 22 may collect statistical information relating to the behavior of the user while using the system 100 and relating to the product and layout choices of the user (step 380). The operator of the server system 22 may provide any pertinent portions of the statistical information to the clients of the operator (step 400).

I claim:

1. A method of facilitating a sale of a real property, which comprises:

enabling a user of a computing device to select a real property from a plurality of real properties being offered for sale;

displaying, on an electronic display, an immersive three-dimensional image of a first one of a plurality of rooms of the real property that has been selected, and seamlessly changing a view on the electronic display in order to display an immersive three-dimensional image of a second one of the plurality of rooms of the real property on the display; and enabling the user of the computing device to remove, add, and/or modify a feature shown in an image selected from the group consisting of the image of the first one of the plurality of rooms of the real property that has been selected and the image of the second one of the plurality of rooms of the real property that has been selected.

2. The method according to claim 1, which further comprises enabling the user to select a plurality of different immersive three-dimensional images of one of the plurality of rooms, wherein each one of the different three-dimensional images originates from a different location within the one of the plurality of rooms.

3. The method according to claim 2, which further comprises enabling the user to change a plurality of features of the real property being displayed in the immersive three-dimensional image.

4. The method according to claim 3, which further comprises enabling the user to change features of a plurality of products being displayed with the real property.

5. The method according to claim 2, which further comprises enabling the user to rank a plurality of real properties that have been displayed in respective immersive three-dimensional images according to preferences of the user.

6. The method according to claim 1, which further comprises enabling the user to rank a plurality of products that have been displayed with a particular one of the plurality of real properties according to preferences of the user.

7. The method according to claim 1, which further comprises:

requiring a seller of the real property to perform a title search, at least one professional inspection, and a valuation of the real property before including the real property within the plurality of real properties being sold; and requiring the user to be pre-qualified or approved for a loan before allowing the user of the computing device to select a real property from the plurality of real properties being sold.

8. The method according to claim 1, wherein the feature shown in the selected image is a wall and the user of the computing device is enabled to move, add, or delete the wall.

9. The method according to claim 1, wherein the feature shown in the selected image is a ceiling and the user of the computing device is enabled to remove, add, or modify the ceiling.

10. The method according to claim 1, wherein the feature shown in the selected image is a floor and the user of the computing device is enabled to modify the floor.

* * * * *